(12) United States Patent
Miyazaki et al.

(10) Patent No.: US 7,104,381 B2
(45) Date of Patent: Sep. 12, 2006

(54) DUAL CONNECTING AND DISCONNECTING APPARATUS

(75) Inventors: Terufumi Miyazaki, Toyota (JP); Yoshihiro Iijima, Seto (JP); Yuji Yasuda, Nishikamo-gun (JP); Hirofumi Onishi, Aichi-gun (JP); Naohiro Imamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 100 days.

(21) Appl. No.: 10/518,645

(22) PCT Filed: Jun. 17, 2003

(86) PCT No.: PCT/IB03/02326

§ 371 (c)(1),
(2), (4) Date: Dec. 20, 2004

(87) PCT Pub. No.: WO03/106868

PCT Pub. Date: Dec. 24, 2003

(65) Prior Publication Data

US 2005/0205378 A1    Sep. 22, 2005

(30) Foreign Application Priority Data

Jun. 18, 2002  (JP)  .............................. 2002-177504
Nov. 1, 2002   (JP)  .............................. 2002-320470
Jan. 17, 2003  (JP)  .............................. 2003-009520

(51) Int. Cl.
*F16D 25/0638* (2006.01)
*F16D 25/10* (2006.01)
*F16H 63/30* (2006.01)

(52) U.S. Cl. .............................. 192/87.11; 192/85 AA; 475/116

(58) Field of Classification Search ............. 192/87.11; 475/116, 146

See application file for complete search history.

(56) References Cited

U.S. PATENT DOCUMENTS

| | | | |
|---|---|---|---|
| 5,662,198 A | | 9/1997 | Kojima et al. |
| 5,865,289 A | * | 2/1999 | Ishimaru .................. 192/87.11 |
| 5,913,397 A | | 6/1999 | Okada et al. |
| 6,374,687 B1 | * | 4/2002 | Tanizawa et al. ............. 74/335 |
| 6,382,382 B1 | | 5/2002 | Avny et al. |
| 6,758,786 B1 | * | 7/2004 | Lepelletier .................. 475/296 |
| 2002/0117356 A1 | | 8/2002 | Wittkopp |

FOREIGN PATENT DOCUMENTS

| | | | |
|---|---|---|---|
| JP | 2-50550 | | 4/1990 |
| JP | 02146345 A | * | 6/1990 |
| JP | 5-39866 | | 2/1993 |
| JP | 06137387 A | * | 5/1994 |
| JP | 9-32919 | | 2/1997 |
| JP | 11-182579 | | 7/1999 |
| JP | 2001-304355 | | 10/2001 |

* cited by examiner

*Primary Examiner*—Richard M. Lorence
(74) *Attorney, Agent, or Firm*—Oblon, Spivak, McClelland, Maier & Neustadt, P.C.

(57) ABSTRACT

A cylinder tube of a second hydraulic cylinder is provided separate from a first piston of a first hydraulic cylinder and integrally fixed to an input shaft. Friction members of a first clutch and friction members of a second clutch are prevented from moving in a first direction by a snap ring attached to a connecting drum. The friction members of the first clutch are friction engaged by the first piston and the friction members of the second clutch are friction engaged by a second piston.

7 Claims, 7 Drawing Sheets

|  | C1 | C2 | B1 | B2 | B3 | F |
|---|---|---|---|---|---|---|
| 1st |  | ○ |  | ◎ |  | ○ |
| 2nd |  | ○ | ○ |  |  |  |
| 3rd |  | ○ |  |  | ○ |  |
| 4th | ○ | ○ |  |  |  |  |
| 5th | ○ |  |  |  | ○ |  |
| 6th | ○ |  | ○ |  |  |  |
| Rev |  |  |  | ○ | ○ |  |

DUAL CONNECTING AND DISCONNECTING APPARATUS

BACKGROUND OF THE INVENTION

1. Field of the Invention

The invention relates to a connecting and disconnecting apparatus of a clutch or a brake or the like. More particularly, the invention relates to a dual connecting and disconnecting apparatus in which a pair of connecting and disconnecting apparatuses are arranged in series in the axial direction.

2. Description of the Related Art

A vehicular automatic transmission is known which uses a plurality of planetary gearsets, clutches, and brakes. The automatic transmission disclosed in Japanese Patent Laid-Open Publication No. 2001-304355, which is one such example, is provided with a dual connecting and disconnecting apparatus having (i) a first hydraulic cylinder in which a piston is moved in a first direction which is parallel with an axis of the dual connecting and disconnecting apparatus by supplying hydraulic fluid into a pressure chamber, (ii) a second hydraulic cylinder which is integrally provided on a common support member (i.e., an input shaft 2) and which is concentric with the first hydraulic cylinder in a position adjacent in the first direction to the first hydraulic cylinder, and in which a piston is moved in the first direction by supplying hydraulic fluid into a pressure chamber, (iii) a cylindrical connecting drum provided on a side wall portion of a cylinder tube of the first hydraulic cylinder integrally mounted to the support member, the connecting drum being centered around the axis and protruding out in the first direction; (iv) a first friction engaging device (i.e., a clutch) positioned farther to the first direction side than the second hydraulic cylinder, the first friction engaging device having (a) a plurality of friction members provided on the connecting drum, this connecting drum being rotatable around the axis with respect to a first connecting member (i.e., a sun gear), the plurality of friction members being non-rotatable with respect to the connecting drum, and (b) a plurality of friction members provided on the first connecting member, the plurality of friction members being non-rotatable with respect to the first connecting member, the first friction engaging device connecting the support member with the first connecting member via the connecting drum by moving the piston of the first hydraulic cylinder in the first direction and engaging the plurality of friction members of the connecting drum with the plurality of friction members of the first connecting member; and (v) a second friction engaging device (i.e., a clutch) positioned farther to the first direction side than the second hydraulic cylinder and adjacent in the axial direction to the first friction engaging device, the second friction engaging device having (a) a plurality of friction members provided on the connecting drum, this connecting drum being rotatable around the axis with respect to a second connecting member (i.e., a sun gear), the plurality of friction members being non-rotatable with respect to the connecting drum, and (b) a plurality of friction members provided on the second connecting member, the plurality of friction members being non-rotatable with respect to the second connecting member, the second friction engaging device connecting the support member with the second connecting member via the connecting drum by moving the piston of the second hydraulic cylinder in the first direction and engaging the plurality of friction members of the connecting drum with the plurality of friction members of the second connecting member. The piston of the first hydraulic cylinder also serves as a cylinder tube of the second hydraulic cylinder. That piston is engaged with the connecting drum so as to be non-rotatable with respect thereto. The friction members of the second friction engaging device are fitted to the piston so as to be non-rotatable with respect thereto and held in position by a stopper member (i.e., a snap ring) attached to the piston.

In this kind of dual connecting and disconnecting apparatus, however, because the second hydraulic cylinder and the second friction engaging device within the cylinder type of the first cylinder are able to move in the axial diction, the sliding resistance and the like of these parts results in the hydraulic pressure in one of the pressure chambers affecting the hydraulic pressure in the other pressure chamber. As a result, it is difficult to finely control both the engaging torque of the first friction engaging device and the engaging torque of the second friction engaging device at the same time, thereby restricting the use of the two friction engaging devices.

Furthermore, because the friction members of the second friction engaging device are fitted to the piston of the first hydraulic cylinder so as to be non-rotatable with respect thereto, a cylindrical drum and spline teeth or the like must be provided on the piston in addition to the connecting drum provided on the cylinder tube, which results in a complex piston shape and high manufacturing costs. Also, because torque is transmitted via the piston of the first hydraulic cylinder when the second friction engaging device is engaged, the operating resistance of the piston of the first hydraulic cylinder changes depending on whether the second friction engaging device is engaged or disengaged, which makes transitional control of the engaging torque when engaging and disengaging the first friction engaging device difficult, for example.

SUMMARY OF THE INVENTION

In view of the foregoing problems, it is an object of the invention to provide a dual connecting and disconnecting apparatus in which a first friction engaging device and a second friction engaging device are mounted to a connecting drum integrally provided on a cylinder tube of a first hydraulic cylinder, and in which engaging torque of both of the friction engaging devices can be finely controlled at the same time with a high degree of accuracy, and in which the piston shape is simplified such that the entire apparatus can be made easily and inexpensively.

In order to achieve the foregoing object, a dual connecting and disconnecting apparatus according to a first aspect of the invention, which has (a) a first hydraulic cylinder in which a piston is moved in a first direction which is substantially parallel with an axis of the dual connecting and disconnecting apparatus by supplying hydraulic fluid into a pressure chamber, (b) a second hydraulic cylinder which is integrally provided on a common support member and which is concentric with the first hydraulic cylinder in a position adjacent in the first direction to the first hydraulic cylinder, and in which a piston is moved in the first direction by supplying hydraulic fluid into a pressure chamber; (c) a cylindrical connecting drum provided on a side wall portion of a cylinder tube of the first hydraulic cylinder integrally mounted to the support member, the connecting drum being centered around the axis and extending out in the first direction; (d) a first friction engaging device positioned farther to the first direction side than the second hydraulic cylinder, the first friction engaging device comprising (i) a friction member provided on the connecting drum, this connecting drum being rotatable around the axis with respect to a first connecting member, the friction member being non-rotatable with respect to the connecting drum, and (ii) a friction member provided on the first connecting member, the friction member being non-rotatable with respect to the first connecting member, the first friction engaging device connecting the support member with the first connecting member via the connecting drum by moving the piston of the first hydraulic cylinder in the first direction and engaging the friction member of the connecting drum with the friction member of the first connecting member; and (e) a second friction engaging device positioned farther to the first direction side than the second hydraulic cylinder and adjacent in the axial direction to the first friction engaging device, the second friction engaging device comprising (i) a friction member provided on the connecting drum, this connecting drum being rotatable around the axis with respect to a second connecting member, the friction member being non-rotatable with respect to the connecting drum, and (ii) a friction member provided on the second connecting member, the friction member being non-rotatable with respect to the second connecting member, the second friction engaging device connecting the support member with the second connecting member via the connecting drum by moving the piston of the second hydraulic cylinder in the first direction and engaging the friction member of the connecting drum with the friction member of the second connecting member, is characterized in that (f) a cylinder tube of the second hydraulic cylinder is provided separately from the piston of the first hydraulic cylinder, and is fixed integrally to the support member, and (g) the friction members of the first friction engaging device and the friction members of the second friction engaging device are fitted into the connecting drum from an end portion thereof on the first direction side from the direction opposite the first direction, and are prevented from moving in the first direction by a stopper member integrally attached to the connecting drum.

According to this dual connecting and disconnecting apparatus, the cylinder tube of the second hydraulic cylinder is provided separately from the piston of the first hydraulic cylinder and fixed integrally to the support member. In addition, the friction member of the first friction engaging device and the friction member of the second friction engaging device are prevented from moving in the first direction by the stopper member attached to the connecting drum. As a result, the friction member of the first friction engaging device and the friction member of the second friction engaging device become friction engaged when pressed against by the piston. Therefore, the first hydraulic cylinder and the second hydraulic cylinder can engage and disengage the first friction engaging device and the second friction engaging device separately. As a result, the engaging torque of the first friction engaging device and the engaging torque of the second friction engaging device can be finely controlled at the same time with a high degree of accuracy, which increases the degree of freedom of the modes in which the pair of friction engaging devices can be used. For example, the pair of friction engaging devices can be used for clutch-to-clutch shifting, in which one device is disengaged while the other is engaged.

Further, the dual connecting and disconnecting apparatus may also be such that (a) among the first friction engaging device and the second friction engaging device, the friction member on the connecting drum side of the one friction engaging device arranged on the side opposite the first direction side in the axial direction is mounted to the connecting drum so as to be non-rotatable with respect thereto; and (b) the piston of the hydraulic cylinder that engages the friction member of the other friction engaging member positioned on the first direction side extends through a notch formed in the friction member of the one friction engaging device and abuts against the friction member of the other friction engaging device.

According to this construction, the friction member on the side opposite the first direction side in the axial direction, i.e., on the connecting drum side of the one friction engaging member arranged adjacent to the second hydraulic cylinder is mounted directly to the connecting drum so as to be non-rotatable with respect thereto. Further, the piston of the hydraulic cylinder that engages the friction member of the other friction engaging device positioned on the first direction side extends through the notch provided in the friction member of the one friction engaging device and abuts against the friction member of the other friction engaging device. Therefore, there is no need to provide a cylindrical drum and spline teeth or the like on the piston, as there is when fitting the friction member to the piston of the first hydraulic cylinder so as to be non-rotatable with respect thereto, as is done conventionally. As a result, the shape of the piston is simplified, making the entire apparatus easier and inexpensive to make. Furthermore, there is no fear that the operating resistance of the piston of the hydraulic cylinder that engages the other friction engaging device will change depending on whether the one friction engaging device is engaged or disengaged so transitional control and the like of the engaging torque during engagement and disengagement of the other friction engaging device is able to be performed with a high degree of accuracy regardless of whether the one friction engaging device is engaged or disengaged.

Also, the dual connecting and disconnecting apparatus may also be such that (a) among the first friction engaging device and the second friction engaging device, the friction member of the one friction engaging device arranged on the side opposite the first direction side in the axial direction is prevented from the first direction side, from moving in the first direction by a spacer fitted to the connecting drum so as to be non-rotatable with respect thereto; and (b) the friction member on the connecting drum side of the other friction engaging device positioned on the first direction side is fitted to the spacer so as to be non-rotatable with respect thereto, and is prevented, along with the spacer, from moving in the first direction by the stopper member.

According to this construction, the friction member of the one friction engaging device on the side opposite the first direction side in the axial direction, i.e., the friction member of the one friction engaging device arranged adjacent to the second hydraulic cylinder, is prevented from moving in the first direction by the stopper member via the spacer. As a result, the length dimension of the apparatus is able to be reduced in the axial direction compared to when separate stopper members are provided for the friction member of the one friction engaging device and the friction member the other friction engaging device. Also, a snap ring is typically used as the stopper member. However, because the snap ring must be compressed in the radial direction when it is fit into an annular groove for assembly in the connecting drum (or expanded in the radial direction after it is fit into the annular groove), it is necessary to increase the radial dimension of the snap ring so that it is greater than the radial dimension necessary for engagement with the friction member, but only by the amount that the snap ring is compressed (or expanded) (i.e., by only the amount of the snap ring that will fit into the annular groove in the connecting drum) in order to avoid interference with the piston that engages the other friction engaging device. When the spacer is used, however, its radial dimension only needs to be equal to the dimension required to engage the friction member and no greater, so the radial dimension of the spacer can be decreased compared to the radial dimension of the snap ring.

In addition, an annular flange bent at a substantially right angle away from the connecting drum so as to be substantially parallel with the friction member of the one friction engaging apparatus may be integrally provided on an end of the spacer.

According to this construction, because the flange is provided on the spacer that prevents the friction member of the one friction engaging device from moving in the first direction, pressure from the piston is able to be distributed evenly over a wide area of the friction member. As a result, localized heat generation and uneven friction are inhibited, and performance in terms of durability and engaging force and the like of the friction engaging device is improved. Furthermore, the pressure plate (i.e., friction member) that contacts the spacer can be made thinner or even eliminated entirely, thereby reducing the cost and enabling the overall length to be reduced. Also, by providing the flange, the rigidity of the spacer itself is increased so the work of forming the splines on the spacer which fit with the friction member of the other friction engaging device and the connecting drum so that the spacer is non-rotatable with respect to both of these, is made easier, thereby enabling manufacturing costs to be reduced.

Further, the dual connecting and disconnecting apparatus may be constructed such that the spacer is prevented from moving in the direction opposite the first direction by an abutting portion provided integrally with the connecting drum so as to allow fitting of the friction member of the one friction engaging device, and is held in position between the abutting portion and the stopper member.

Accordingly, when the one friction engaging device is disengaged, it is possible to prevent a deterioration in power transmission efficiency and fuel efficiency caused by the spacer moving in the direction opposite the first direction when the friction engaging device is disengaged and causing the friction members to slip engage, resulting in dragging loss and heat buildup which can burn the friction members.

DETAILED DESCRIPTION OF THE PREFERRED EMBODIMENTS

Figures 1A, 1B:
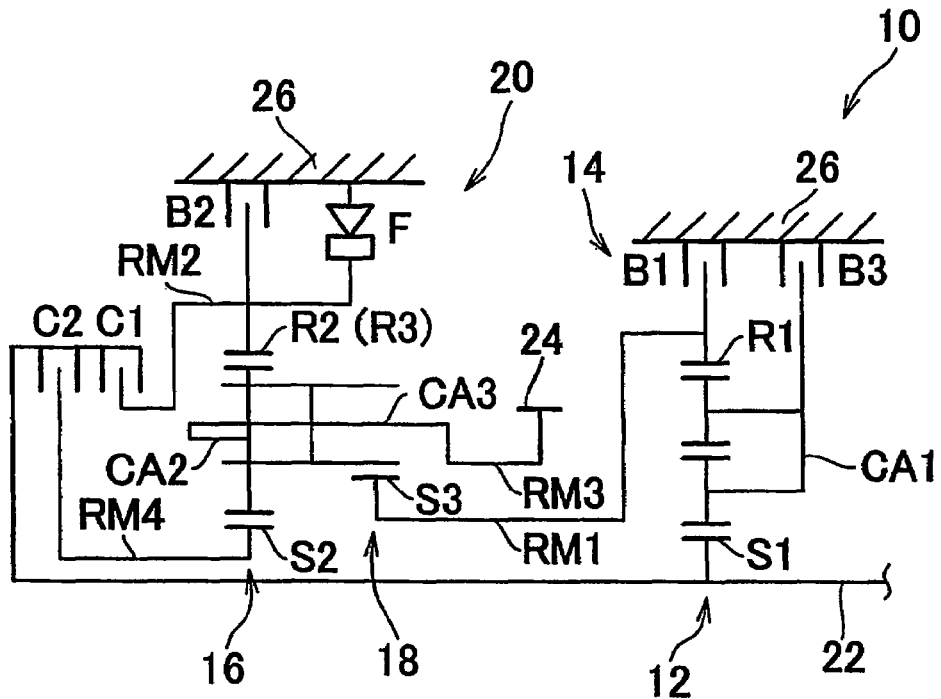
FIG. 1A is a skeleton view of a vehicular automatic transmission to which the invention has been applied.
FIG. 1B is a table showing engagement/disengagement combinations of friction elements for achieving each speed.

A dual connecting and disconnecting apparatus according to the invention is preferably applied to a power transmitting apparatus of a vehicle, such as a planetary gear type automatic transmission or a forward-reverse switching apparatus that switches between a plurality of speeds and forward and reverse according to an operating state of a clutch and a brake which serve as a friction engaging device, for example. Further, the dual connecting and disconnecting apparatus of the invention can also be applied to a power transmitting apparatus other than a power transmitting apparatus used in a vehicle.

A hydraulic cylinder and friction engaging device according to the invention are cylindrical in shape and centered around an elongated support member, for example. A connecting drum is integrally connected to an outer cylinder of a cylinder tube of the first hydraulic cylinder so as to be continuous therefrom. A first friction engaging device and a second friction engaging device are housed on the inner peripheral side of the connecting drum. Various other aspects are possible, however, such as providing the connecting drum so that it is continuous from an inner cylinder of the first hydraulic cylinder and arranging the friction engaging device on the outer peripheral side of that connecting drum, or arranging the hydraulic cylinder and the friction engaging device on the inside of the connecting drum using a cylindrical support member, or employing a device having a disk-shaped piston having the center portion serve as the second hydraulic cylinder.

In both the first friction engaging device and the second friction engaging device, it is preferable to use multiple-disc clutches and brakes in which at least two friction members are provided on each of two members that are rotatable relative to each other. Alternatively, however, it is also possible to employ a single-disc friction engaging device in which there is only one friction member provided on each of the two members.

The transmission of power between the support member and the first connecting member or the second connecting member may be such that power is either transmitted from the support member to the first or second connecting member or from the first or second connecting member to the support member, or the direction of power transmission may even be changed according to a specific condition. Also, the support member, first connecting member, and second connecting member may all be rotatable around the axis. Alternatively, any one of those members may be fixed to a housing or the like so as to be unable to rotate around the axis. Also, the first connecting member and the second connecting member may be so that they are not connected to each other and are rotatable with respect to each other, or they may be connected to each other so as to rotate together.

It is preferable that the second friction engaging device be one friction engaging device and the first friction engaging device be another friction engaging device, but the reverse is also possible.

Also, the friction members on the connecting drum side of the one friction engaging device are directly mounted to the connecting drum so as to be non-rotatable with respect thereto. Alternatively, similar to the related art, a piston for engaging the other friction engaging device may be engaged with the connecting drum so as to be non-rotatable with respect thereto, and the friction members of the one friction engaging device may be mounted to the piston so as to be both non-rotatable, yet movable in the axial direction, with respect thereto, as long as movement of the friction members in a first direction is prohibited by at least one stopper member mounted to the connecting drum.

Further, the friction members of the other friction engaging device may be fitted to a spacer so as to be non-rotatable with respect thereto, and the friction members of the one friction engaging device may be prohibited from moving in the first direction by the spacer. Also, the friction members on the connecting drum side of both the one and the other friction engaging device may be fitted to the connecting drum so as to be non-rotatable with respect thereto, and movement of those friction members in the first direction may be prohibited by a separate stopper member for each of the friction engaging devices.

Because the spacer is fitted to both the friction members of the other friction engaging device and the connecting drum so as to be non-rotatable with respect both of these, splines are provided on the cylindrical inner and outer peripheral surfaces of the spacer, for example. However, it is also possible to form the spacer by bending or drawing it with a press into a wavy shape in which the dimension of the diameter changes cyclically around the periphery. The waves of can be used to function as splines, and can be made both easily and inexpensively. By also forming the connecting drum into a wavy shape by similar press work, splines can also be formed on the connecting drum both easily and inexpensively.

Also, an abutting portion may be provided. In this case, a step may be formed by making the dimensions of the portion of the connecting drum where the friction members of the one friction engaging device are fitted different from those of the portion of the connecting drum where the spacer is fitted, for example, and this step may be used as the abutting portion. That is, when the connecting drum is positioned on the outer peripheral side, by making the diameter of the connecting drum larger at the portion where the spacer is fitted than at the portion where the friction members of the one friction engaging device are fitted, the friction members of the one friction engaging device are able to be fitted to the connecting drum, while the spacer abuts against the step (i.e., the abutting portion) between the small diameter portion and the large diameter portion, thus preventing the spacer from moving in the direction opposite the first direction. In a case in which the friction members of the one friction engaging device are fitted to the connecting drum so as to be non-rotatable with respect thereto via a piston for engaging the other friction engaging device, as well, a step may be provided by making the dimension of the diameter of the portion where the piston is fitted different from the dimension of the diameter of the portion where the spacer is fitted. The abutting portion may be a protrusion that protrudes to either the inner peripheral side or the outer peripheral side and engages the spacer. For example, movement of the spacer may also be prevented by fixing an abutting portion which is a separate member, such as a bolt which screws in the radial direction, to the connecting drum. In this way, various aspects are possible.

Hereinafter, a first exemplary embodiment of the invention will be described in detail with reference to the drawings.

FIG. 1A is a skeleton view of a vehicular automatic transmission 10 to which the invention has been applied. FIG. 1B is a table showing engagement/disengagement combinations of friction elements for achieving a plurality of speeds. The vehicular automatic transmission 10 is a transversely mounted transmission for use in an FF (i.e., front engine, front-wheel drive) vehicle or the like, and includes a first transmitting portion 14 and a second transmitting portion 20 on a single axis. The first transmitting portion 14 has a double pinion type first planetary gearset 12 as its main component, while the second transmitting portion 20 has a single pinion type second planetary gearset 16 and a double pinion type third planetary gearset 18 as its main components. The vehicular automatic transmission 10 takes the rotation from the input shaft 22, changes it, and outputs the changed rotation to an output gear 24. The input shaft 22 corresponds to an input member such as a turbine shaft of a torque converter driven by a driving source for running an engine or the like. The output gear 24 corresponds to an output member and drives left and right driven wheels via a differential gear unit The vehicular automatic transmission 10 is substantially symmetrical with respect to its center line or axis. In FIG. 1A, the half below the center line has been omitted.

The first planetary gearset 12, which largely makes up the first transmitting portion 14, includes three rotating elements, which are a sun gear S1, a carrier CA1, and a ring gear R1. The sun gear S1 is connected to, and driven by, the input shaft 22, while the carrier CA1 is fixed via a third brake B3 to a case 26 which does not rotate. The ring gear R1 functions as an intermediate output member, outputting power while rotating at a slower speed than the input shaft 22. Further, the second planetary gearset 16 and the third planetary gearset 18, which together largely make up the second transmitting portion 20, are coupled together at four portions which serve as four rotating elements RM1 to RM4. More specifically, a sun gear S3 of the third planetary gearset 18 serves as the first rotating element RM1; a ring gear R2 of the second planetary gearset 16 and a ring gear R3 of the third planetary gearset 18 are coupled together and serve as the second rotating element RM2; a carrier CA2 of the second planetary gearset 16 and a carrier CA3 of the third planetary gearset 18 are coupled together and serve as the third rotating element RM3; and a sun gear S2 of the second planetary gearset 16 serves as the fourth rotating element RM4. The second planetary gearset 16 and the third planetary gearset 18 together form a Ravigneaux type planetary gear train, in which the carriers CA2 and CA3, as well as the ring gears R2 and R3, are shared as common members, and the pinion gear of the second planetary gearset 16 also serves as the second pinion gear of the third planetary gearset 18.

The first rotating element RM1 (i.e., the sun gear S3) can be selectively prevented from rotating by coupling it to the case 26 by a first brake B1. The second rotating element RM2 (i.e., the ring gears R2 and R3) may be selectively coupled to the input shaft 22 by a first clutch C1 and selectively prevented from rotating by coupling it to the case 26 with a second brake B2. The fourth rotating element RM4 (i.e., the sun gear S2) can be selectively coupled to the input shaft 22 via a second clutch C2. The first rotating element RM1 (i.e., the sun gear S2) is integrally connected to the ring gear R1 of the first planetary gearset 12, which serves as the intermediate output member. The third rotating element RM3 (i.e., the carriers CA2 and CA3) is integrally connected to the output gear 24 and outputs rotation thereto. The first brake B1, the second brake B2, third brake B3, first clutch C1, and second clutch C2 together serve as a multiple-disc hydraulic friction engaging device in which they are all frictionally engaged by a hydraulic cylinder. Along with the second brake B2, a one-way clutch F, which allows forward rotation of the second rotating element RM2 (i.e., rotation in the same direction as that of the input shaft 22) while preventing reverse rotation, is also provided between the second rotating element RM2 and the case 26.

Figure 2:
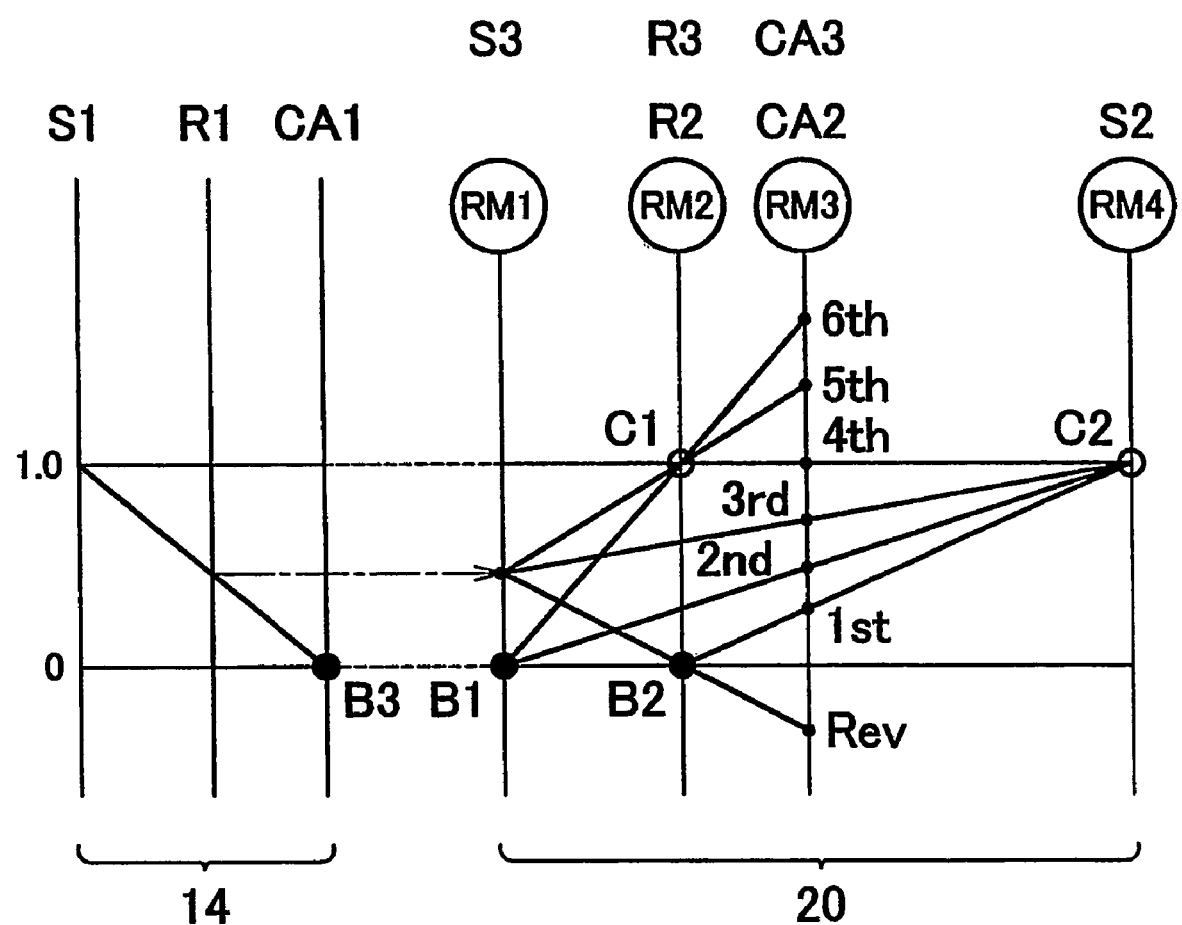
FIG. 2 is an alignment graph for the exemplary embodiment shown in FIG. 1A and FIG. 1B.

FIG. 2 is an alignment graph illustrating, using straight lines, the rotational speed of each of the rotating elements of the first transmitting portion 14 and the second transmitting portion 20. The lower horizontal line in the drawing denotes a rotational speed of "0" and the upper horizontal line in the drawing denotes a rotational speed of "1.0", i.e., a rotational speed the same as that of the input shaft 22. Further, the vertical lines corresponding to the first transmitting portion 14 denote, in order from left to right, the sun gear S1, the ring gear R1, and the carrier CA1, with the intervals between those lines set according to a gear ratio $\rho 1$ (= the number of teeth on the sun gear/the number of teeth on the ring gear) of the first planetary gearset 12. Similarly, the four vertical lines corresponding to the second transmitting portion 20 denote, in order from left to right, the first rotating element RM1 (i.e., the sun gear S3), the second rotating element RM2 (i.e., the ring gears R2 and R3), the third rotating element RM3 (i.e., the carriers CA2 and CA3), and the fourth rotating element RM4 (i.e., the sun gear S2), with the intervals therebetween set according to a gear ratio $\rho 2$ of the second planetary gearset 16 and a gear ratio $\rho 3$ of the third planetary gearset 18.

As is evident from the alignment graph, when the second clutch C2 and the second brake B2 are engaged, such that the fourth rotating element RM4 rotates integrally with the input shaft 22 and the second rotating element RM2 is kept from rotating, the third rotating element RM3 coupled to the output gear 24 rotates at a rotational speed denoted by "1st" and a first speed "1st", which has the largest gear ratio, is achieved. When the second clutch C2 and the first brake B1 are engaged, such that the fourth rotating element RM4 rotates integrally with the input shaft 22 and the first rotating element RM1 is kept from rotating, the third rotating element RM3 rotates at a rotational speed denoted by "2nd" and a second speed "2nd", which has a gear ratio smaller than that of the first speed "1st", is achieved. When the second clutch C2 and the third brake B3 are engaged, such that the fourth rotating element RM4 rotates integrally with the input shaft 22 and the first rotating element RM1 rotates via the first transmitting portion 14 at a slower speed than the input shaft 22, the third rotating element RM3 rotates at a rotational speed denoted by "3rd" and a third speed "3rd", which has a gear ratio smaller than that of the second speed "2nd", is achieved. When the first clutch C1 and the second clutch C2 are engaged, such that the second transmitting portion 20 rotates integrally with the input shaft 22, the third rotating element RM3 rotates at a rotational speed denoted by "4th", i.e., the third rotating element RM3 is rotated at the same speed as the input shaft 22, and a fourth speed "4th", which has a gear ratio smaller than that of the third speed "3rd", is achieved. This fourth speed "4th" has a gear ratio of 1:1. When the first clutch C1 and the third brake B3 are engaged, such that the second rotating element RM2 rotates integrally with the input shaft 22 and the first rotating element RM1 rotates via the first transmitting portion 14 at a slower speed than the input shaft 22, the third rotating element RM3 rotates at a rotational speed denoted by "5th" and a fifth speed "5th", which has a gear ratio smaller than that of the fourth speed "4th", is achieved. When the first clutch C1 and the first brake B1 are engaged, such that the second rotating element RM2 rotates integrally with the input shaft 22 and the first rotating element RM1 is kept from rotating, the third rotating element RM3 rotates at a rotational speed denoted by "6th" and a sixth speed "6th", which has a gear ratio smaller than that of the fifth speed "5th", is achieved. Further, when the second brake B2 and the third brake B3 are engaged, such that the second rotating element RM2 is kept from rotating and the first rotating element RM1 rotates via the first transmitting portion 14 at a slower speed than the input shaft 22, the third rotating element RM3 rotates in reverse at rotational speed denoted by "Rev" and a reverse speed "Rev" is achieved.

The table in FIG. 1B shows the relationships between each of the speeds and the operating states of the first clutch C1, the second clutch C2, the first brake B1, the second brake B2, and the third brake B3. The single circle denotes engagement and the double circle denotes engagement only with engine braking. Because the one-way clutch F is provided along with the second brake B2 used to achieve the first speed "1st", it is not always necessary to engage the second brake B2 when taking off (i.e., when accelerating). Also, the gear ratio for each speed is set appropriately according to the gear ratio $\rho 1$ of the first planetary gearset 12, the gear ratio $\rho 2$ of the second planetary gearset 16, and the gear ratio $\rho 3$ of the third planetary gearset 18.

Figure 3:
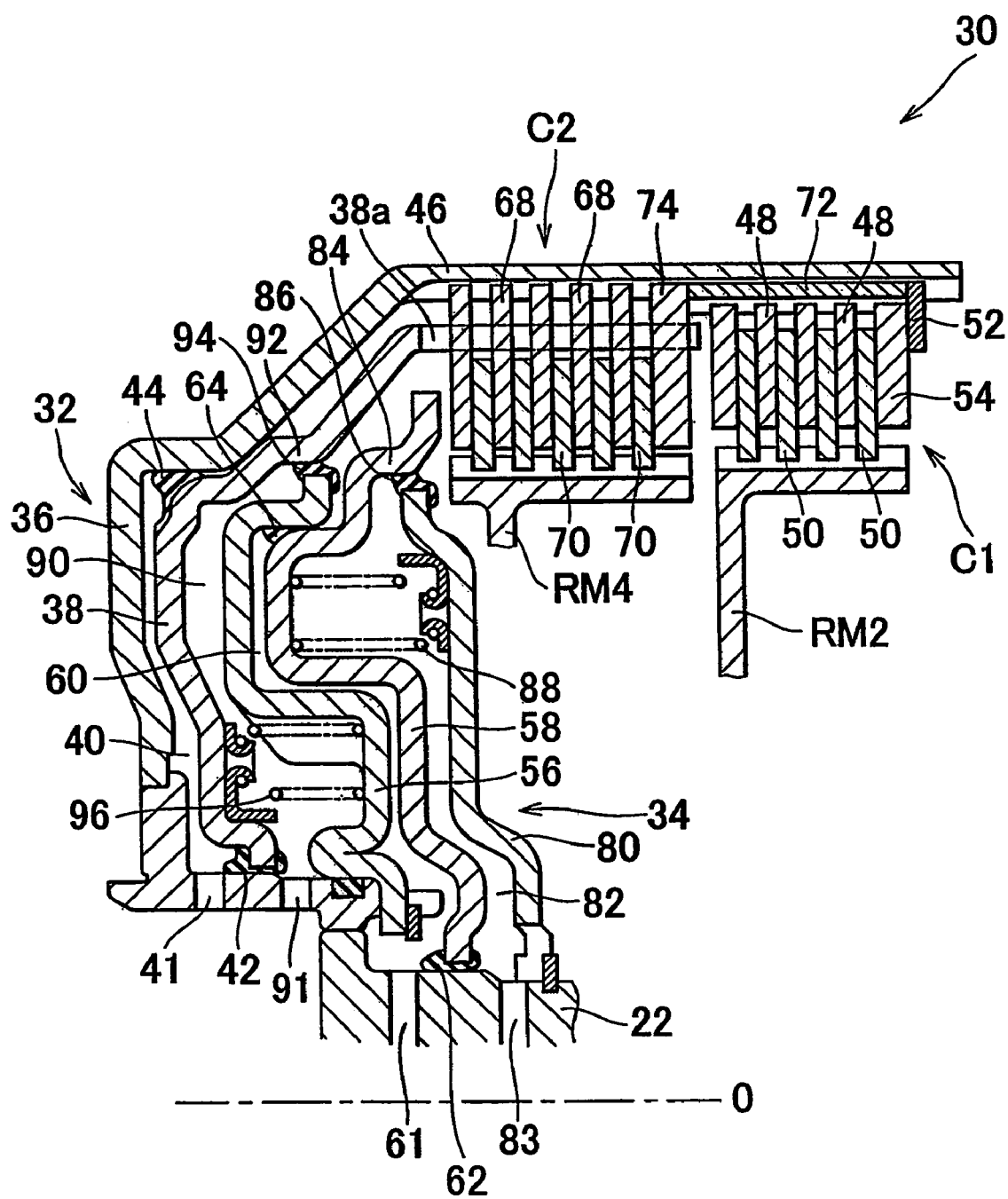
FIG. 3 is a cross-sectional view showing in detail clutch C1 and C2 portions of the vehicular automatic transmission shown in FIG. 1A.

FIG. 3 is a cross-sectional view showing in detail the upper half, from the centerline or axis 0, of a dual connecting and disconnecting apparatus 30 which enables and interrupts the transmission of power between the input shaft 22 which serves as the support member, the second rotating element RM2 which serves as the first connecting member, and the fourth rotating element RM4 which serves as the second connecting member. The dual connecting and disconnecting apparatus 30 is also provided with a first hydraulic cylinder 32 which frictionally engages the first clutch C1, and a second hydraulic cylinder 34 which frictionally engages the second clutch C2. The first hydraulic cylinder 32 and second hydraulic cylinder 34 are both cylindrical and are integrally attached to the input shaft 22, centered therearound on the same axis so that they rotate together with the input shaft 22 around the axis 0.

The first hydraulic cylinder 32 is provided with a cylinder tube 36 and a piston 38. The cylinder tube 36, which is formed in a cylindrical shape with the bottom, i.e. end, open to the right in FIG. 3, is attached to the input shaft 22 so as to be non-rotatable with respect thereto, as well as so as not to be able to move in the axial direction (i.e., in the direction of the axis 0) (i.e., in the left and right directions in the drawing). The piston 38 is fitted inside the cylinder tube 36 so as to be able to move along the axis 0. Hydraulic fluid is supplied from a hydraulic fluid passage 41 into a pressure chamber 40 between the cylinder tube 36 and the piston 38 so that the piston 38 is forced out in a first direction, i.e., to the right in the drawing, thereby frictionally engaging the first clutch C1. Seal members 42 and 44, made of rubber or the like, are fixed to the inner and outer peripheral portions of the piston 38 to seal the pressure chamber 40. Also, a cylindrical connecting drum 46 is integrally attached to a side wall portion (the outer cylinder portion of the outer peripheral side, in this exemplary embodiment) of the cylinder tube 36 which is integrally attached to the input shaft 22. This connecting drum 46 is centered around the axis 0 and extends out in the first direction. The first clutch C1 includes multiple friction members 48 which are attached to the inner peripheral side of the connecting drum 46 so as to be non-rotatable with respect thereto, and multiple friction members 50 which are attached to the second rotating element RM2 so as to be non-rotatable with respect thereto alternately between the multiple friction members 48. The piston 38 frictionally engages the friction members 48 and friction members 50, thereby connecting the second rotating element RM2 to the input shaft 22.

The second hydraulic cylinder 34 is provided adjacent, in the first direction (i.e., to the right in FIG. 3), to the first hydraulic cylinder 32. The second hydraulic cylinder 34 includes a cylinder tube 56 and a piston 58. The cylinder tube 56 is cylindrical with a bottom, i.e. end, that opens to the right in FIG. 3. This cylinder tube 56 is mounted to the input shaft 22 so as to be non-rotatable with respect thereto, and so as not to be able to move in the axial direction (i.e., the direction of the axis 0). The piston 58 is fitted inside this cylinder tube 56 so as to be movable in the axial direction. Hydraulic fluid is supplied from a hydraulic fluid passage 61 into a pressure chamber 60 between a cylinder tube 56 and the piston 58 so that the piston 58 is forced out in the first direction, i.e., to the right in the drawing, thereby frictionally engaging the second clutch C2. Seal members 62 and 64, made of rubber or the like, are fixed to the inner and outer peripheral portions of the piston 58 to seal the pressure chamber 60. Also, the second clutch C2 is mounted to the inner peripheral side of the connecting drum 46 in a location in the first direction from the second hydraulic cylinder 34, i.e., further to the right in the drawing than the second hydraulic cylinder 34, so that it is between the second hydraulic cylinder 34 and the first clutch C1 and adjacent to the first clutch C1. The second clutch C2 includes multiple friction members 68 which are attached to the inner peripheral side of the connecting drum 46 so as to be non-rotatable with respect thereto, and multiple friction members 70 which are attached to the fourth rotating element RM4 so as to be non-rotatable with respect thereto alternately between the multiple friction members 68. The piston 58 frictionally engages the friction members 68 and friction members 70, thereby connecting the fourth rotating element RM4 to the input shaft 22.

Figure 4:
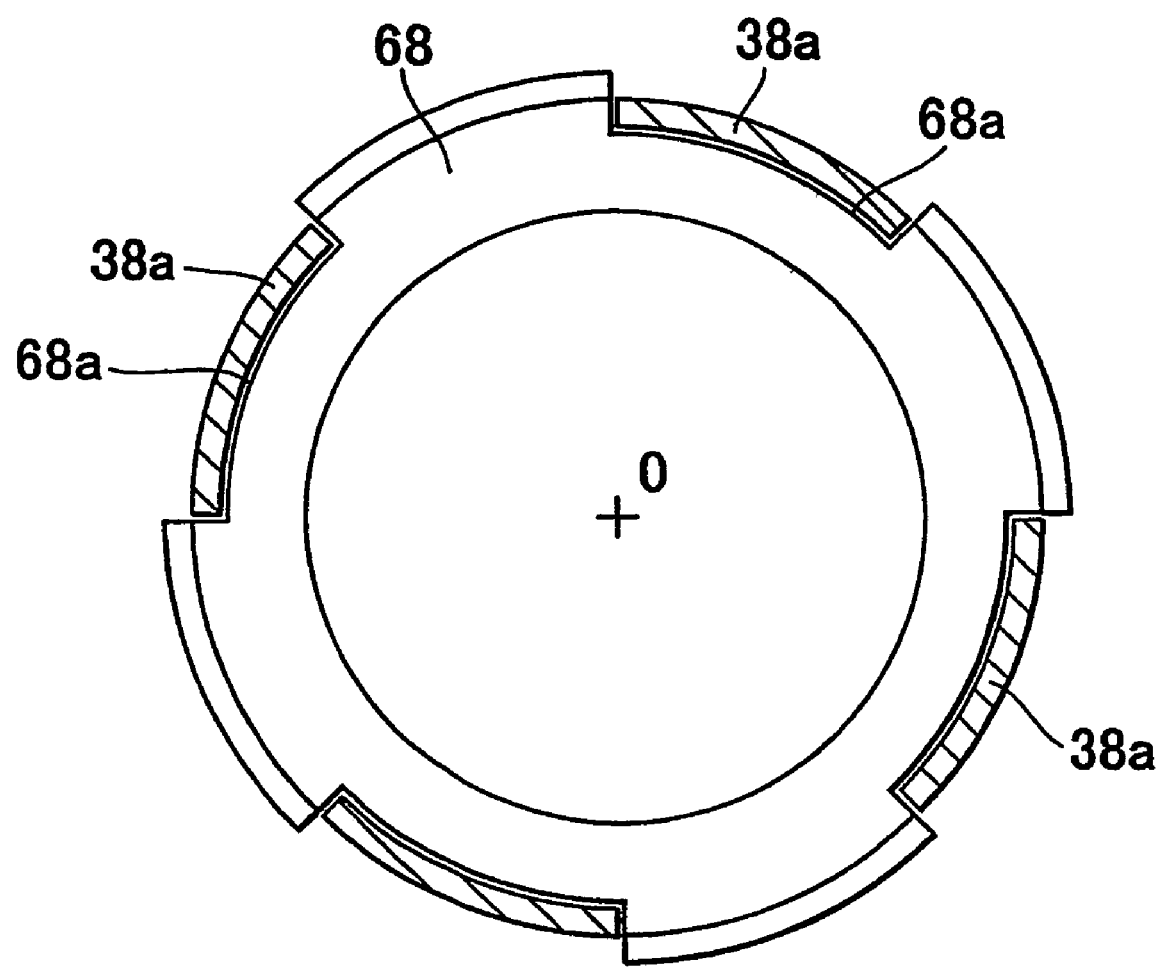
FIG. 4 is a view showing the relationship between the friction member on a connecting drum side of the clutch C2 shown in FIG. 3 and a piston of a first hydraulic cylinder.

The friction members 48 and friction members 50 of the first clutch C1 and the friction members 68 and friction members 70 of the second clutch C2 are inserted into the connecting drum 46 from the end portion thereof on the first direction side, from the direction opposite the first direction, i.e., inserted to the left in the drawing. The friction members 48 of the first clutch C1 and the friction members 68 of the second clutch C2 engage by spline engagement or the like with the connecting drum 46. Likewise, the friction members 50 of the first clutch C1 and the friction members 70 of the second clutch C2 engage by spline engagement or the like with the second rotating element RM2 and the fourth rotating element RM4, respectively. Furthermore, the friction members 68 are prevented from moving in the first direction from the second clutch C2 side by a snap ring 52 integrally attached to an end portion of the connecting drum 46, via a spacer 72 that is spline fitted to the connecting drum 46 so as to be non-rotatable with respect thereto. The friction members 68 pressed together between a pressure plate 74, which is held in position by the spacer 72, and the piston 58. Notches 68a are provided in four locations equal distances apart in the friction members 68, as shown in FIG. 4, while four engaging prongs 38a are provided on the piston 38 of the first hydraulic cylinder 32 which extend in the first direction from the piston 38 in locations corresponding to the notches 68a in the friction members 68. These engaging prongs 38a extend through the notches 68a all the way to the first clutch C1. Further, the friction members 48 on the connecting drum 46 side of the first clutch C1 are spline fitted to the spacer 72 so as to be non-rotatable with respect thereto. The friction members 48 are prevented from moving in the first direction by the snap ring 52 which holds the spacer 72 in position. Accordingly, the friction members 48 are pressed against the friction members 50 between the pressure plate 54, which is held in position by the snap ring 52, and the piston 38. According to this exemplary embodiment, the second clutch C2 mounted on the side opposite the first direction side in the direction along the axis 0, i.e., on the left side in FIG. 3, is the one friction engaging device, the first clutch C1 is the other friction engaging device, and the snap ring 52 functions as the stopper member.

Figure 5A:
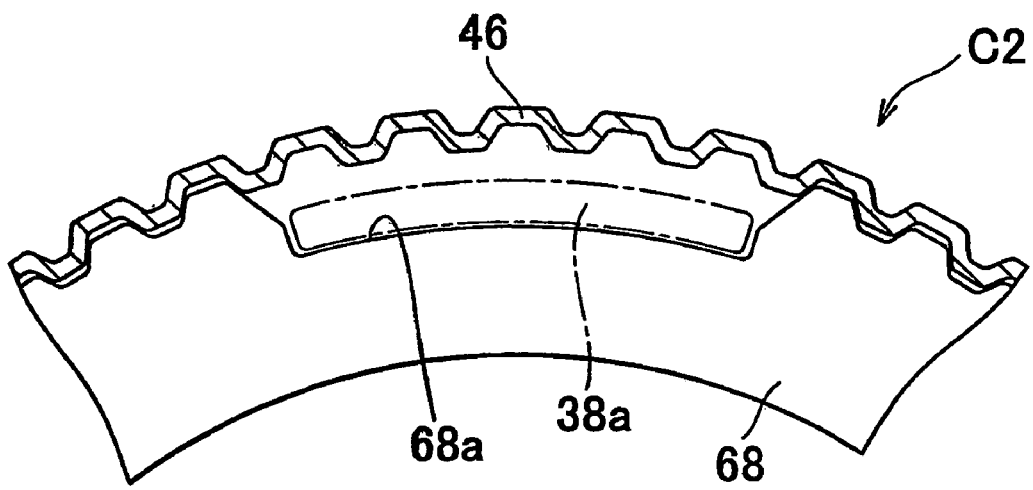
FIG. 5A is a localized cross-sectional view of the exemplary embodiment shown in FIG. 3, which shows in detail how the friction members are engaged with the connecting drum of the second clutch C2.
Figure 5B:
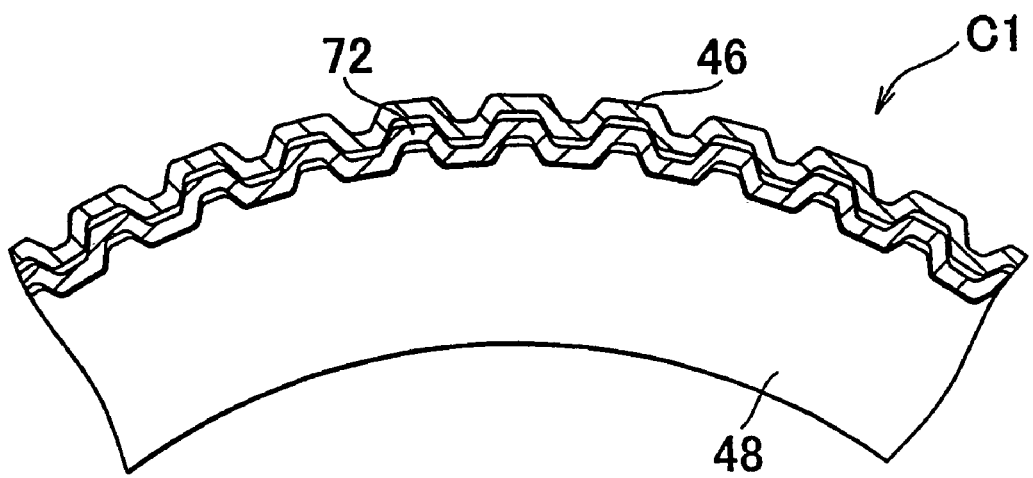
FIG. 5B is a cross-sectional view showing in detail how the connecting drum, a spacer, and the friction members in the first clutch C1 are engaged with each other.

FIG. 5A is a cross-sectional view showing in detail how the friction members 68 are engaged with the connecting drum 46 in the second clutch C2. The connecting drum 46 is formed by drawing or bending with a press into a wavy shape in which the dimension of the diameter changes cyclically around the periphery, and the resultant waves on the inner peripheral surface are used as splines. These splines then mesh with the splines formed on the outer peripheral portions of the friction members 68 so that the connecting drum 46 and the friction members 68 are not able to rotate with respect to one another. Also, FIG. 5B is a cross-sectional view showing in detail how the connecting drum 46, the spacer 72, and the friction members 48 in the first clutch C1 are engaged with each other. The spacer 72 is formed by drawing or bending with a press in a similar fashion into a wavy shape in which the dimension of the diameter changes cyclically around the periphery, and the resultant waves on the inner and outer peripheral surfaces are used as splines. These splines then mesh with the waves or splines formed on the outer peripheral portion of the connecting drum 46, as well as with the splines formed on the outer peripheral portions of the friction members 48 so that the spacer 72 is non-rotatable with respect to both the connecting drum 46 and the friction members 48. By using the waves able to be formed by drawing or bending with a press as splines in this way, the connecting drum 46 and the spacer 72 can be constructed both easily and inexpensively.

Referring back now to FIG. 3, the second hydraulic cylinder 34 also has a cancel plate 80 provided integrally with the input shaft 22. A centrifugal hydraulic pressure canceling chamber 82 is formed between this cancel plate 80 and the piston 58. The centrifugal hydraulic pressure canceling chamber 82 is on the opposite side of the piston 58 from the pressure chamber 60. When hydraulic fluid is introduced into the centrifugal hydraulic pressure canceling chamber 82 from a hydraulic fluid passage 83, centrifugal hydraulic pressure generated within the pressure chamber 60 as it rotates around the axis 0 is cancelled out. The piston 58 is provided with a cylindrical outer cylinder portion 84. A seal member 86, which is made of rubber or the like, is fixed to the outer peripheral edge of the cancel plate 80 and slides against the inner peripheral surface of the outer cylinder portion 84. This seal member 86 allows movement by the piston 58 while providing a seal between the inner peripheral surface of the outer cylinder portion 84 and the cancel plate 80. Inside the centrifugal hydraulic pressure canceling chamber 82 is a return spring 88 which returns the piston 58 to the left in FIG. 3 as the hydraulic pressure within the pressure chamber 60 drops, thereby releasing the second clutch C2.

Also, the first hydraulic cylinder 32 uses the cylinder tube 56 of the second hydraulic cylinder 34 as a cancel plate. A centrifugal hydraulic pressure canceling chamber 90 is formed between the cylinder tube 56 and the piston 38. The centrifugal hydraulic pressure canceling chamber 90 is on the opposite side of the piston 38 from pressure chamber 40. When hydraulic fluid is introduced into the centrifugal hydraulic pressure canceling chamber 90 from a hydraulic fluid passage 91, centrifugal hydraulic pressure generated within the pressure chamber 40 as it rotates around the axis 0 is cancelled out. The piston 38 is provided with a cylindrical outer cylinder portion 92 fitted to the outer peripheral side of the cylinder tube 56. A seal member 94, which is made of rubber or the like, is fixed to the outer peripheral edge of the cylinder tube 56 and slides against the inner peripheral surface of the outer cylinder portion 92. This seal member 94 allows movement by the piston 38 while providing a seal between the inner peripheral surface of the outer cylinder portion 92 and the cylinder tube 56. Inside the centrifugal hydraulic pressure canceling chamber 90 is a return spring 96 which returns the piston 38 to the left in FIG. 3 as the hydraulic pressure within the pressure chamber 40 drops, thereby releasing the first clutch C1.

According to this exemplary embodiment, the cylinder tube 36 and the piston 38 of the first hydraulic cylinder 32 and the cylinder tube 56, the piston 58, and the cancel plate 80 of the second hydraulic cylinder 34 are all made of metal sheeting by drawing with a press. Alternatively, however, they may be cast, die-cast, or forged or the like, and made of aluminum or an aluminum alloy or the like.

In the dual connecting and disconnecting apparatus 30 according to this exemplary embodiment, the cylinder tube 56 of the second hydraulic cylinder 34 is provided separate from the piston 38 of the first hydraulic cylinder 32 and integrally fixed to the input shaft 22, while the friction members 48 and friction members 50 of the first clutch C1 and the friction members 68 and friction members 70 of the second clutch C2 are all prevented from moving in the first direction by the snap ring 52 attached to the connecting drum 46. As a result, when friction members 48 and friction members 50 of the first clutch C1 are pressed together by the piston 38, they frictionally engage with each other. Likewise, when the friction members 68 and the friction members 70 are pressed together by the piston 58, they also frictionally engaging with each other. Therefore, the first hydraulic cylinder 32 and the second hydraulic cylinder 34 engage and disengage the first clutch C1 and the second clutch C2 separately. As a result, it is possible to finely control the engagement torque of the first clutch C1 and the engagement torque of the second clutch C2 at the same time with a high degree of accuracy, thereby improving the degree of freedom of the modes in which the first clutch C1 and second clutch C2 can be used.

Also, the friction members 68 on the connecting drum 46 side of the second clutch C2 which is arranged adjacent to the second hydraulic cylinder 34 are spline fitted directly to the connecting drum 46 so as to be non-rotatable with respect thereto. The piston 38 of the first hydraulic cylinder 32 engages the first clutch C1, which is positioned on the first direction side of the second clutch C2 in the axial direction (i.e., in the direction of the axis 0). The piston 38 of the first hydraulic cylinder 32 extends through the notches 68a in the friction members 68 and presses against the friction members 48 and friction members 50 of the first clutch C1. Therefore, there is no need to provide a cylindrical drum and spline teeth or the like on the piston 38, as there is when fitting the friction members 68 of the second clutch C2 to the piston 38 of the first hydraulic cylinder 32 so that they are non-rotatable with respect thereto, as is done conventionally. As a result, the shape of the piston 38 is simplified, making the entire apparatus easier and inexpensive to make. Furthermore, there is no fear that the operating resistance of the piston 38 of the first hydraulic cylinder 32 will change depending on whether or not the second clutch C2 is engaged or disengaged so transitional control and the like of the engaging torque during engagement and disengagement of the first clutch C1 is able to be performed with a high degree of accuracy regardless of whether the second clutch C2 is engaged or disengaged.

Also, by using the snap ring 52 via the spacer 72 to prevent the friction members 68 and friction members 70 of the second clutch C2 from moving in the first direction, the length dimension in the axial direction (i.e., in the direction of the axis 0) is able to be decreased compared to when a snap ring is used to hold the friction members 68 and friction members 70 of the second clutch C2 in position in the same manner as on the first clutch C1 side. Also, because the snap ring must be compressed in the radial direction when it is fit into an annular groove for assembly in the connecting drum 46, it is necessary to increase the radial dimension of the snap ring so that it is greater than the radial dimension necessary for engagement with the pressure plate 74, but only by the amount that the snap ring is compressed (i.e., by only the amount of the snap ring that will fit into the annular groove in the connecting drum 46) in order to avoid interference with the engaging prongs 38a of the piston 38 of the first hydraulic cylinder 32. When the spacer 72 is used, however, its radial dimension only needs to be equal to the dimension required to engage the pressure plate 74 and no greater, so the radial dimension of the spacer 72 can be decreased compared to the radial dimension of the snap ring.

Next, a second exemplary embodiment according to the invention will be described. In the following second exemplary embodiment, members that are substantially the same as those of the first exemplary embodiment will be denoted with the same reference numerals and characters, and descriptions thereof will be omitted.

In the first exemplary embodiment, the cylindrical spacer 72 is used which abuts against the outer peripheral portion of the pressure plate 74. Alternatively, however, the end of the spacer 72 may be formed in a flange 102 which is substantially parallel with the pressure plate 74, as shown in a dual connecting and disconnecting apparatus 100 in FIG. 6. In this case, because the pressure plate 74 is supported over a wide area by the flange 102, pressure from the piston 58 is distributed evenly over a wide area of the friction members 68 and friction members 70. As a result, localized heat generation and uneven friction are inhibited, and performance in terms of durability and engaging force and the like of the second clutch C2 is improved. Furthermore, the pressure plate 74 can be made thinner or even eliminated entirely, thereby reducing the cost and enabling the overall length to be reduced. Also, by providing the flange 102, the rigidity of the spacer 72 itself is increased so the work of pressing it into a wavy shape in which the waves serve as splines, and the like, is made easier, thereby enabling manufacturing costs to be reduced.

Notches are provided in the flange 102 just as with the friction members 68, so that the engaging prongs 38a of the piston 38 are able to extend through it. Also, in the dual connecting and disconnecting apparatus 100, wavy shaped meshing teeth 104 are provided on the engaging prongs 38a portions of the piston 38, which engage with the splines (i.e., waves) on the connecting drum 46 so that the engaging prongs 38a of the piston 38 are non-rotatable with respect the connecting drum 46. The piston 38 may be cast, die-cast, or forged or the like, and made of aluminum or an aluminum alloy or the like, for example. Furthermore, similar meshing teeth may also be provided in the first embodiment.

Figure 6:
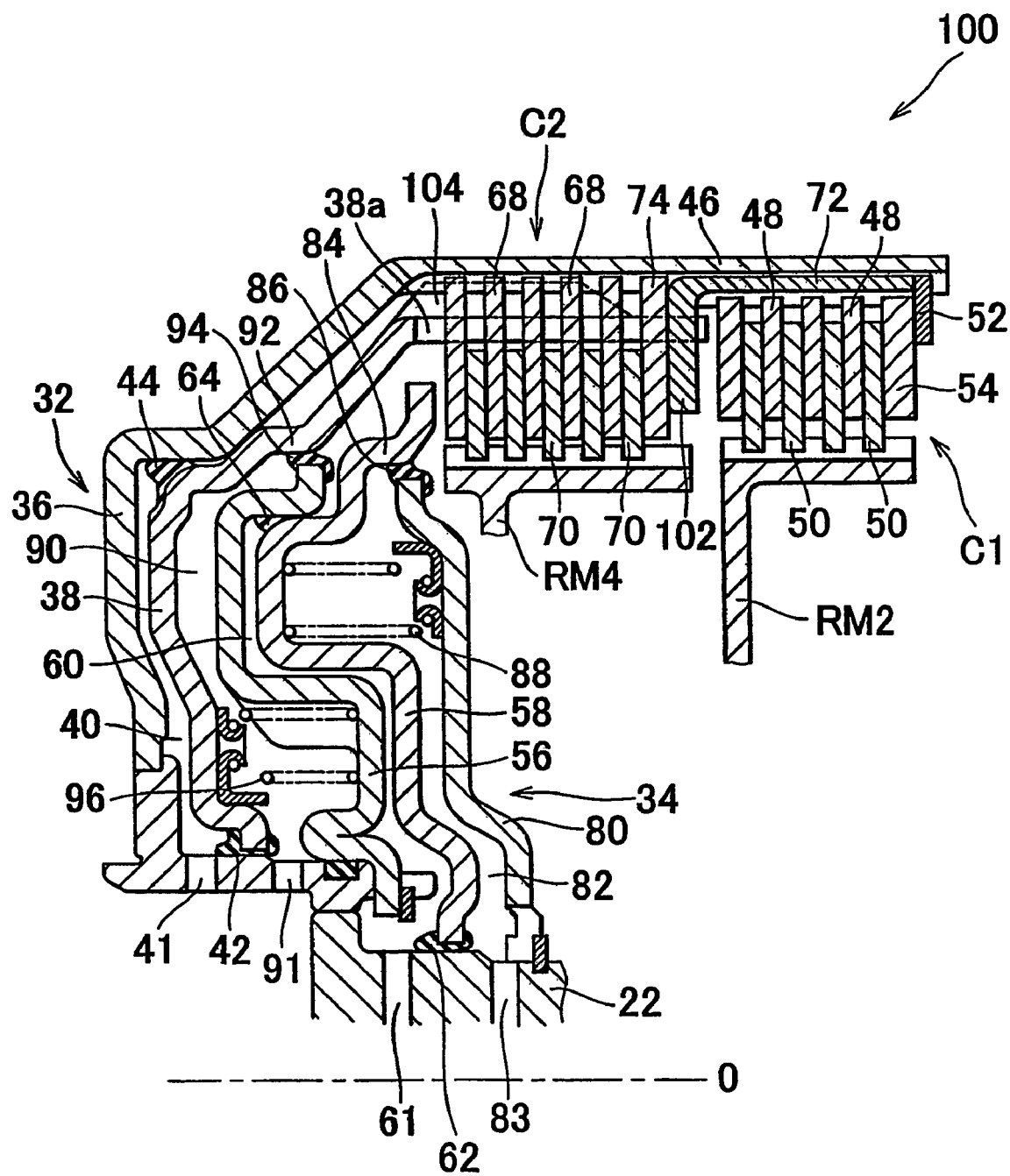
FIG. 6 is a cross-sectional view which corresponds to FIG. 3, which shows another exemplary embodiment of the invention.
Figure 7:
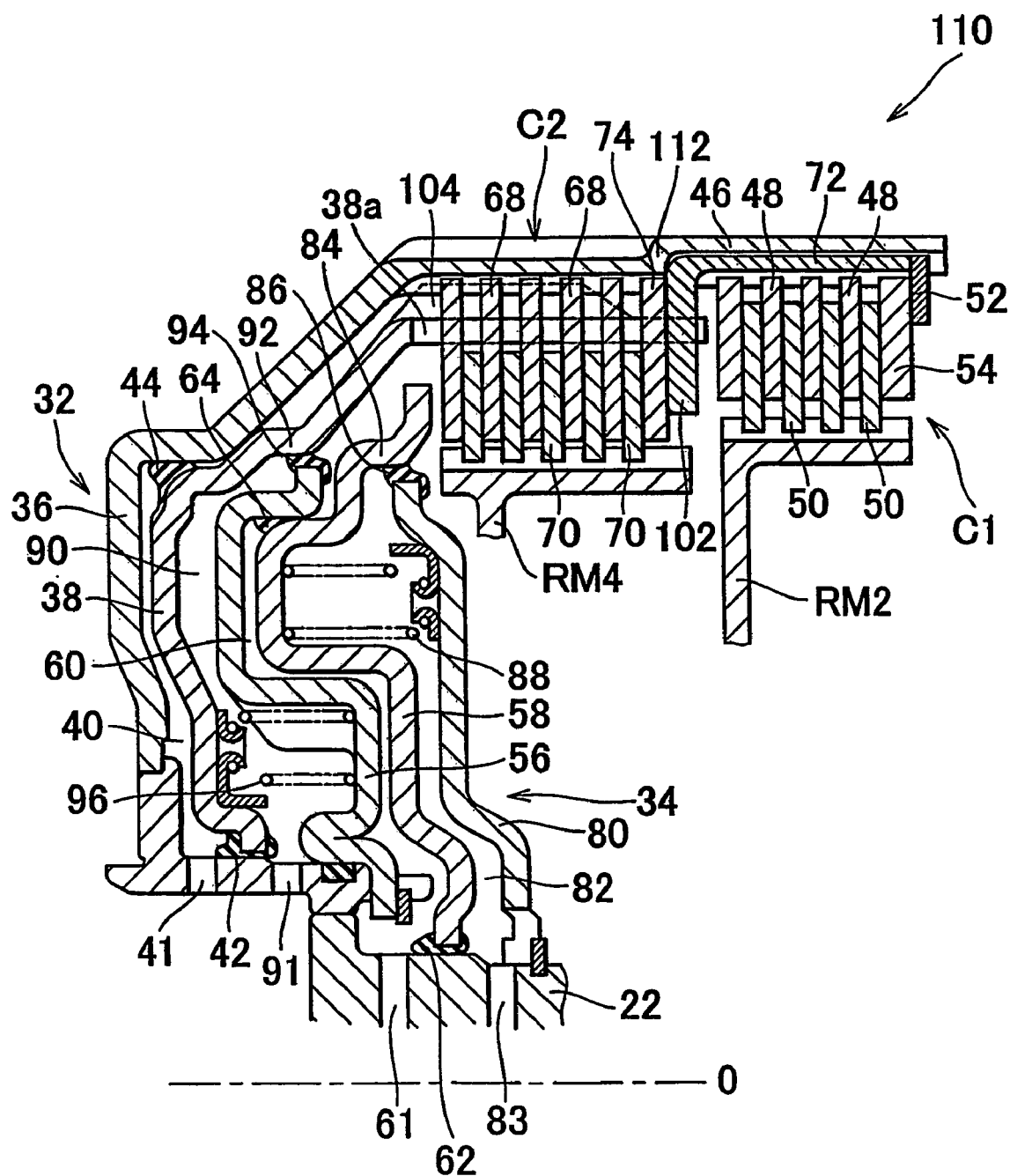
FIG. 7 is a cross-sectional view which also corresponds to FIG. 3, which shows yet another exemplary embodiment of the invention.

In comparison with the dual connecting and disconnecting apparatus 100 shown in FIG. 6, a dual connecting and disconnecting apparatus 110 according to a third exemplary embodiment shown in FIG. 7 is constructed such that the radial dimension of the portion of the connecting drum 46 where the spacer 72 is fitted, i.e., the radial dimension of the portion on the first direction side, which is the open side (i.e., to the right in FIG. 7), is relatively larger than the radial dimension of the portion of the connecting drum 46 where the friction members 68 of the second clutch C2 are fitted, and the spacer 72 is abutted against a step 112 between the two portions of different diameters while allowing the friction members 68 to be fitted. As a result, the spacer 72 is prevented from moving in the direction opposite the first direction, with the spacer 72 being held in position between the step 112 and the snap ring 52. This step 112 corresponds to an abutting portion provided integrally with the connecting drum 46.

In this case, because the spacer 72 is held in position in the axial direction between the step 112 and the snap ring 52, it is possible to prevent a deterioration in power transmission efficiency and fuel efficiency caused by the spacer 72 moving in the direction opposite the first direction when the second clutch C2 is disengaged and causing the friction members 68 and friction members 70 to slip engage, resulting in dragging loss and heat buildup which can burn the friction members 68 and friction members 70.

Although exemplary embodiments have been described herein with reference to the drawings, many modifications and variations therein will readily occur to those skilled in the art. Accordingly, all such variations and modifications are included within the intended scope of the invention.

The cylinder tube 56 of the second hydraulic cylinder 34 is provided separate from a piston 38 of the first hydraulic cylinder 32 and integrally fixed to the input shaft 22. Friction members 48 and 50 of the first clutch C1 and friction members 48 and 50 of the second clutch C2 are prevented from moving in a first direction by the snap ring 52 attached to the connecting drum 46. The friction members 48 and 50 of the first clutch C1 are friction engaged by the piston 38 and the friction members 48 and 50 of the second clutch C2 are friction engaged by the piston 58.

What is claimed is:

1. A dual connecting and disconnecting apparatus comprising:
    a first hydraulic cylinder in which a piston is moved in a first direction which is parallel with an axis of the dual connecting and disconnecting apparatus by supplying hydraulic fluid into a first pressure chamber;
    a second hydraulic cylinder which is integrally provided on a common support member and which is concentric with the first hydraulic cylinder in a position adjacent in the first direction to the first hydraulic cylinder, and in which a piston is moved in the first direction by supplying hydraulic fluid into a second pressure chamber;
    a cylindrical connecting drum provided on a side wall portion of a cylinder tube of the first hydraulic cylinder integrally mounted to the support member, the connecting drum being centered around the axis and extending out in the first direction;
    a first friction engaging device positioned farther to the first direction side than the second hydraulic cylinder, the first friction engaging device comprising (i) a first friction member provided on the connecting drum, this connecting drum being rotatable around the axis with respect to a first connecting member, the first friction member being non-rotatable with respect to the connecting drum, and (ii) a second friction member provided on the first connecting member, the second friction member being non-rotatable with respect to the first connecting member, the first friction engaging device connecting the support member with the first connecting member via the connecting drum by moving the piston of the first hydraulic cylinder in the first direction and engaging the first friction member of the connecting drum with the second friction member of the first connecting member; and
    a second friction engaging device positioned farther to the first direction side than the second hydraulic cylinder and adjacent in the axial direction to the first friction engaging device, the second friction engaging device comprising (i) a third friction member provided on the connecting drum, this connecting drum being rotatable around the axis with respect to a second connecting member, the third friction member being non-rotatable with respect to the connecting drum, and (ii) a fourth friction member provided on the second connecting member, the fourth friction member being non-rotatable with respect to the second connecting member, the second friction engaging device connecting the support member with the second connecting member via the connecting drum by moving the piston of the second hydraulic cylinder in the first direction and engaging the third friction member of the connecting drum with the fourth friction member of the second connecting member,
    a cylinder tube of the second hydraulic cylinder is provided separately from the piston of the first hydraulic cylinder, and is fixed integrally to the support member, and
    the first friction member and the second friction member of the first friction engaging device and the third friction member and the fourth friction member of the second friction engaging device are fitted into the connecting drum from an end portion thereof on the first direction side from the direction opposite the first direction, and are prevented from moving in the first direction by a stopper member integrally attached to the connecting drum,
    wherein among the first friction engaging device and the second friction engaging device, the friction member of the one friction engaging device arranged on the side opposite the first direction side in the axial direction is prevented from the first direction side, from moving in the first direction by a spacer fitted to the connecting drum so as to be non-rotatable with respect thereto; and
    the friction member on the connecting drum side of the other friction engaging device positioned on the first direction side is fitted to the spacer so as to be non-rotatable with respect thereto, and is prevented, along with the spacer, from moving in the first direction by the stopper member.

2. The dual connecting and disconnecting apparatus according to claim 1, wherein:
    among the first friction engaging device and the second friction engaging device, the friction member on the connecting drum side of the one friction engaging device arranged on the side opposite the first direction side in the axial direction is mounted to the connecting drum so as to be non-rotatable with respect thereto; and the piston of the hydraulic cylinder that engages the friction member of the other friction engaging device positioned on the first direction side extends through a notch formed in the friction member of the one friction engaging device and abuts against the friction member of the other friction engaging device.

3. The dual connecting and disconnecting apparatus according to claim 1, wherein:

the first friction member and the second friction member are pressed together between the piston of the first hydraulic cylinder and the stopper member and engaged by moving the piston in the first direction; and the third friction member and the fourth friction member are pressed together between the piston of the second hydraulic cylinder and the stopper member via the spacer and engaged by moving the piston in the first direction.

4. The dual connecting and disconnecting apparatus according to claim 1, wherein:

an annular flange bent at a substantially right angle away from the connecting drum so as to be substantially parallel with the friction member of the one friction engaging device is integrally provided on an end of the spacer.

5. The dual connecting and disconnecting apparatus according to claim 1, wherein:

the spacer is prevented from moving in the direction opposite the first direction by an abutting portion provided integrally with the connecting drum so as to allow fitting of the friction member of the one friction engaging device, and is held in position between the abutting portion and the stopper member.

6. The dual connecting and disconnecting apparatus according to claim 1, wherein:

the support member is a rotating input shaft of the dual connecting and disconnecting apparatus.

7. The dual connecting and disconnecting apparatus according to claim 1, wherein:

the first friction member and the second friction member of the first friction engaging device are provided in plurality; and the third friction member and the fourth friction member of the second friction engaging device are provided in plurality.

* * * * *